United States Patent
Silverstein et al.

(10) Patent No.: US 12,081,837 B2
(45) Date of Patent: Sep. 3, 2024

(54) DIGITAL PRESENTATION SHARING AND AUDIENCE INCENTIVIZATION

(71) Applicant: INTERNATIONAL BUSINESS MACHINES CORPORATION, Armonk, NY (US)

(72) Inventors: Zachary A. Silverstein, Georgetown, TX (US); Melanie Dauber, Oceanside, NY (US); Jacob Ryan Jepperson, St. Paul, MN (US); Spencer Thomas Reynolds, Austin, TX (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 17/812,499

(22) Filed: Jul. 14, 2022

(65) Prior Publication Data

US 2024/0022793 A1    Jan. 18, 2024

(51) Int. Cl.
*H04N 21/4784* (2011.01)
*G06Q 20/14* (2012.01)
(Continued)

(52) U.S. Cl.
CPC ....... *H04N 21/4784* (2013.01); *G06Q 20/145* (2013.01); *G06Q 20/367* (2013.01);
(Continued)

(58) Field of Classification Search
CPC ........... G06Q 30/0208; G06Q 30/0209; G06Q 30/0239
See application file for complete search history.

(56) References Cited

U.S. PATENT DOCUMENTS

| 10,326,667 B2 | 6/2019 | Jones |
|---|---|---|
| 2009/0303984 A1 | 12/2009 | Clark |

(Continued)

FOREIGN PATENT DOCUMENTS

KR    20220145087 A1 *  4/2021  ............. G06Q 50/50

OTHER PUBLICATIONS

"Decentralized autonomous organization", Wikipedia, May 25, 2022, 7 pages, <https://en.wikipedia.org/wiki/Decentralized_autonomous_organization>.

(Continued)

*Primary Examiner* — Ilana L Spar
*Assistant Examiner* — Melinda Gieringer
(74) *Attorney, Agent, or Firm* — Pramod Chintalapoodi

(57) ABSTRACT

Systems, methods and/or computer program products issuing and transferring presentation rights between users during digital events using NFTs and incentivizing audiences to remain active attendees of digital event as new presenters take over the presentation. Value exchanged for obtaining NFTs representing presentation rights can correlate to a speaker score which is calculated using audience metrics collected by the platform. Presenters with higher presenter scores and larger or more active audiences can result in higher valuations, increasing the value of the NFT being purchased. Exchanges of value and NFTs are executed using non-custodial wallets and/or smart contracts. The value exchanged for the NFT can be split between original presenters' wallets and wallets of the audience members in pre-determined ratios. Funds provided to audience members' wallets during digital events can be locked or restricted for pre-set minimum amounts of time, incentivizing audience members to remain attentive to the next presenter.

14 Claims, 7 Drawing Sheets

(51) Int. Cl.
  *G06Q 20/36* (2012.01)
  *G06Q 30/0207* (2023.01)
  *G06Q 30/0208* (2023.01)

(52) U.S. Cl.
  CPC ..... *G06Q 20/3678* (2013.01); *G06Q 30/0208* (2013.01); *G06Q 30/0209* (2013.01); *G06Q 30/0239* (2013.01); *G06Q 2220/00* (2013.01)

(56) References Cited

U.S. PATENT DOCUMENTS

| | | | |
|---|---|---|---|
| 2010/0318399 | A1 | 12/2010 | Li |
| 2012/0140681 | A1 | 6/2012 | Kaminsky |
| 2012/0182384 | A1* | 7/2012 | Anderson ........... H04L 65/1073 348/14.09 |
| 2014/0282676 | A1 | 9/2014 | Joergens |
| 2014/0344360 | A1* | 11/2014 | Bank ..................... H04L 65/403 709/204 |
| 2016/0073054 | A1* | 3/2016 | Balasaygun ........ H04L 12/1822 348/14.08 |
| 2016/0088259 | A1 | 3/2016 | Anderson |
| 2018/0330736 | A1 | 11/2018 | Faulkner |
| 2021/0056750 | A1 | 2/2021 | Rowley |
| 2022/0103566 | A1 | 3/2022 | Faulkner |
| 2022/0191257 | A1* | 6/2022 | Aceron ............... G06F 3/04842 |
| 2022/0337898 | A1* | 10/2022 | Dorogusker ..... H04N 21/47815 |

OTHER PUBLICATIONS

"IBM Think 2022", IBM, downloaded from the internet on May 26, 2022, 7 pages, <https://www.ibm.com/events/think/>.

"Metaverse Summit", Metaverse Summit, downloaded from the internet on Jul. 1, 2022, 37 pages, <https://metaverse-summit.org/>.

"Metaverse", Wikipedia, last edited on May 15, 2022, 11 pages, <https://en.wikipedia.org/wiki/Metaverse>.

"Television Programming Planning & Implementation", Study.com, Updated: Jan. 24, 2022, 3 pages, <https://study.com/academy/lesson/television-programming-planning-implementation.html>.

"Resolving Concurrent Speakers", An IP.com Prior Art Database Technical Disclosure, Authors et. al.: Disclosed Anonymously, IP.com No. IPCOM000215818D, IP.com Electronic Publication Date: Mar. 12, 2012, 3 pages.

Entis, Laura, "Making money in the metaverse", LinkedIn, downloaded from the internet on May 26, 2022, 2 pages, <https://www.linkedin.com/news/story/making-money-in-the-metaverse-5696818/>.

Mell et al., "The NIST Definition of Cloud Computing", Recommendations of the National Institute of Standards and Technology, Special Publication 800-145, Sep. 2011, 7 pages.

Williams, Chris, "An Instagram Model Launched a DAO to Build Web3 Social Media", Celsius, Jan. 16, 2022, 7 pages, <https://cryptobriefing.com/instagram-model-launched-dao-web3-social-media/>.

Wu et al., "Handling a Large Roster for Online Conferences", An IP.com Prior Art Database Technical Disclosure, IP.com No. IPCOM000238947D, IP.com Electronic Publication Date: Sep. 26, 2014, 5 pages.

\* cited by examiner

DIGITAL PRESENTATION SHARING AND AUDIENCE INCENTIVIZATION

BACKGROUND

The present disclosure relates generally to the field of digital communications including videoconferencing, presentation tools, and platforms. More specifically the disclosure relates to communication tools and platforms that provide digital rights sharing opportunities, and incentives shared between presenters and/or audience members.

Virtual meetings and web conferences are gatherings of participants that can be held over the internet or other types of computing networks using applications, services and platforms that provide features or functions configured to share voice, video, text, audio, files and more. Each participant is able to view and/or participate in the virtual meetings from their own computer device through web applications or services that may be accessible via a web browser or standalone applications installed onto their device. Certain types of virtual meetings may be referred to as a "webinar" in which communication can be one-way. In other words, a designated speaker, or panel of speakers, present during the webinar while audience members watch and/or listen. Interaction between participants during a webinars or other types of virtual meetings can be limited to chat only, allowing audience members to talk to each other or submit questions to the designated speaker without interrupting the presentation.

A non-fungible token (NFT) can refer to a cryptographic asset that may exist on a blockchain and cannot be replicated. The NFT may comprise unique identification codes and metadata that distinguishes the NFTs from each other. NFTs differ from cryptocurrencies because the NFT is not traded or exchanged at equivalency. Fungible tokens on the other hand, such as cryptocurrencies, are identical to one another and often serve as a medium for transactions, whereas NFTs can function to uniquely represent individual identities, property rights (both real and virtual), even real-world items such as artwork and real estate.

SUMMARY

Embodiments of the present disclosure relate to a computer-implemented method, an associated computer system and computer program products for issuing and trading presentation rights during a digital event. The computer-implemented method comprises capturing, by a processor, audience metrics during the digital event; applying, by the processor, weights to the audience metrics captured; calculating, by the processor, a score assigned to a current presenter during the digital event, taking into consideration the audience metrics and the weights applied to the audience metrics; imputing, by the processor, the score assigned to the current presenter into a non-fungible token (NFT); storing, by the processor, the NFT in a non-custodial wallet belonging to the current presenter, wherein possession of the NFT in a non-custodial wallet possessed by a subsequent presenter grants the presentation rights during the digital event; transferring, by the processor, currency from the non-custodial wallet possessed by the subsequent presenter to the non-custodial wallet belonging to the current presenter and one or more non-custodial wallets of audience members attending the digital event, in exchange for the NFT being deposited into the non-custodial wallet possessed by the subsequent presenter; and upon transferring the NFT to the non-custodial wallet possessed by the subsequent presenter, granting, by the processor, presentation rights to the subsequent presenter during the digital event.

BRIEF DESCRIPTION OF THE DRAWINGS

The drawings included in the present disclosure are incorporated into, and form part of, the specification. The drawings illustrate embodiments of the present disclosure and, along with the description, explain the principles of the disclosure. The drawings are only illustrative of certain embodiments and do not limit the disclosure.

DETAILED DESCRIPTION

Figure 1:
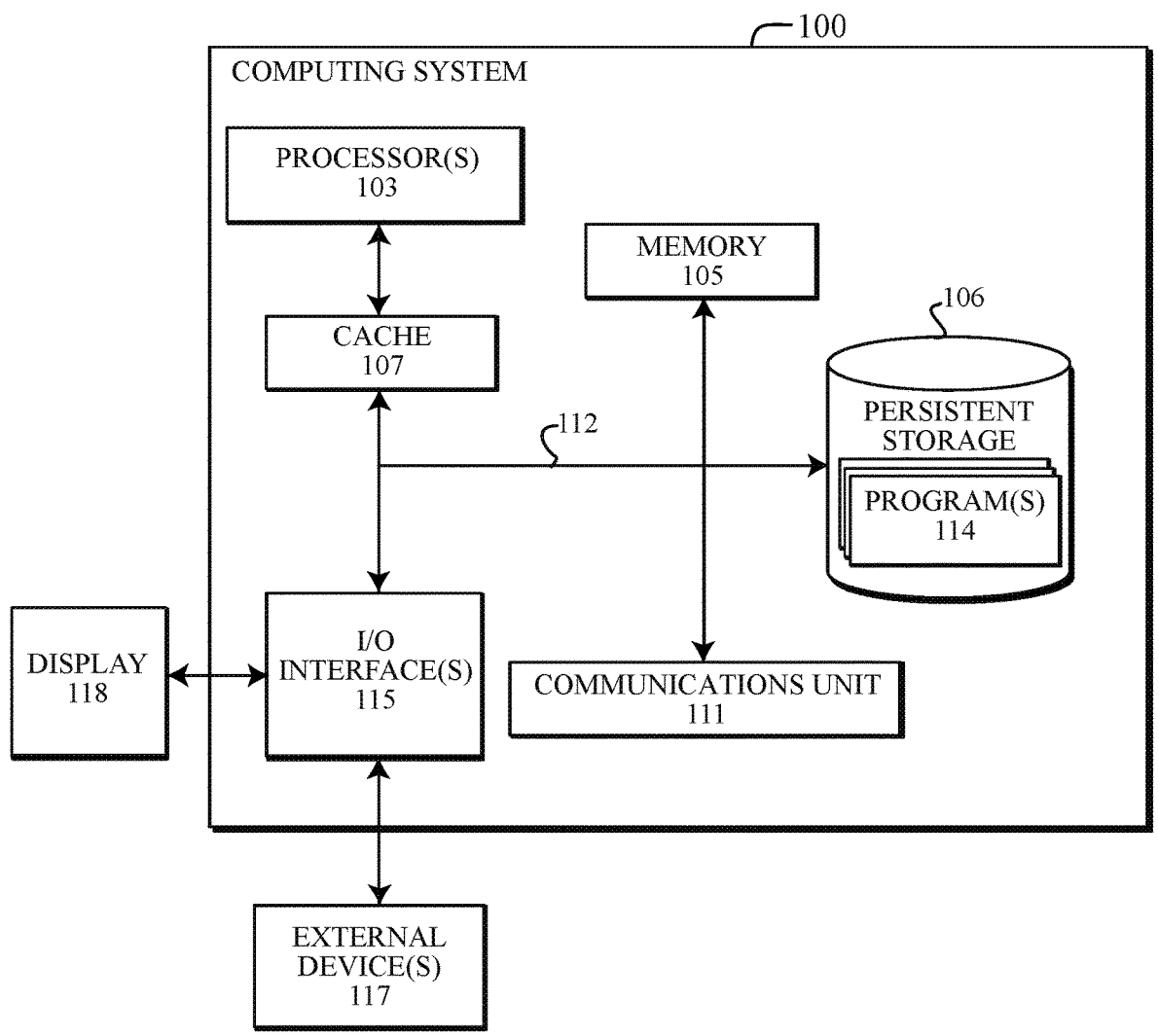
FIG. 1 depicts a block diagram illustrating an embodiment of a computing system and the internal and external components thereof, upon which embodiments described herein may be implemented in accordance with the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The corresponding structures, materials, acts, and equivalents of all means or steps plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments chosen and described are in order to best explain the principles of the disclosure, the practical applications and to enable others of ordinary skill in the art to understand the disclosure for various embodiments with various modifications as are suited to the particular use contemplated.

Overview

Earning and maintaining the attention of an audience can be very valuable to individuals, companies or commercial processes. An individual who can captivate an audience that listens to them is not only valuable to presenters of content, but can be important for distributing the content itself, as well as benefit the audience members and subsequent presenters making presentations following the original presenter. Allowing the subsequent presenters to tap into the original presenter's audience, which may remain accessible following the original presenter's presentation, can provide a benefit of valuable exposure and goodwill built up by the original presenter who attracted the initial audience in the first place. Embodiments of the present disclosure recognize that captivating and incentivizing an existing audience to engage with a new presenter within a digital environment can be very difficult, especially as audience members may be continuously entering or leaving various platforms, chatrooms, servers, virtual conference rooms, and/or metaverse spaces viewing or discussing the content being presented in real time. Therefore, there is a long felt need for systems, methods and program products for issuing, tracking and transferring speaking or presentation rights within a virtual meeting session that designates the next presenter and also incentivizes audience members to stay and experience presentations and content delivered by subsequent presenters within a session of a virtual meeting or conference.

Embodiments of the present disclosure are directed toward issuing and/or transferring speaking and presentation rights during digital events taking place in a virtual environment, such as web conferences, virtual meetings, webinars, metaverse, etc. Transferal of presenting rights occurs between the current presenter and individuals vying for those rights to become presenter. Audience members are incentivized to remain engaged with the subsequent presenters obtaining presentations rights. Embodiments of the present disclosure allow users comprising both the initial presenter, potential future presenters and audience members to opt into the presentation module by joining a virtual environment, such as a chatroom, conference session or other virtual space. As users opt-in to the presentation module and join the virtual environment as part of a deployed interactive session, the presentation module may have access to various user logs describing the current presenter and audience members. For example, logged information can include the presenter's UserID, wallet address, name, one or more presentation modifiers and other profiled characteristics of the presenter. As the presenting user (i.e., referred to herein interchangeably as the "presenter" or "speaker") begins speaking, embodiments of the presentation module may capture growth metrics describing the audience on the platform or environment where the virtual presentation is occurring. For instance, data describing the metrics of the audience can include data such as the total size of the audience, concurrent viewership of the audience, attentiveness of the audience, rate of growth within a discussion channel, level of activity within a discussion channel, user feedback, etc.

The captured growth metrics can be imputed into a compensation or monetary system, that enables non-fungible tokens and currency or other digital or real items of value to be traded in exchange for presentation rights within the virtual environment. The right to speak or present may be captured or maintained using a non-custodial wallet. Within the wallet, an NFT or smart contract can be executed to determine ownership of the presenter role during the virtual presentation, conference, webinar or other type of virtual interaction. In some embodiments, presenter rights can be traded using an exchange of currency transferred between digital wallets, and/or auctioned using a bidding system. Upon determining the next presenter, payment provided for the presentation rights can be deducted from the next presenter's wallet in exchange for the NFT, and the deducted money from the next presenter's wallet can be split in an agreed upon ratio between audience members and the current presenter. Deductions from the next presenter's wallet can be transferred to non-custodial wallets accessible by the current presenter and each of the audience members. In some embodiments, audience payments can be locked or restricted for a minimum period of time while the next presenter takes over the presentation and presents to the audience. Audience members can earn the payment that has been locked or restricted through their attentiveness to the new presenter's presentation or simply by remaining in attendance.

In some instances, a new presenter may purchase the presentation rights for a pre-determined amount of time. Embodiments of the present disclosure may allow the current presenter to compensate both the previous presenter and/or the audience for the additional time the current presenter uses over the allotted time granted. For example, based on the amount of excess time beyond the purchased amount of time for being in the presenter role, the current presenter may deposit additional compensation into the non-custodial wallets of the previous presenter and/or the audience members. Moreover, in some embodiments, additional penalties may be applied to the reputation of the current presenter on the platform. For example, reducing an overall rating or point system indicating the quality of the current speaker, which may have additional effects on obtaining the presentation rights in the future.

Computing System

The present invention may be a system, a method, and/or a computer program product at any possible technical detail level of integration. The computer program product may include a computer-readable storage medium (or media) having the computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus, or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

FIG. 1 illustrates a block diagram describing an embodiment of a computing system 100, which may be a simplified example of a computing device (i.e., a physical bare metal system and/or a virtual system) capable of performing the computing operations described herein. Computing system 100 may be representative of the one or more computing systems or devices implemented in accordance with the embodiments of the present disclosure and further described below in detail. It should be appreciated that FIG. 1 provides only an illustration of one implementation of a computing system 100 and does not imply any limitations regarding the environments in which different embodiments may be implemented. In general, the components illustrated in FIG. 1 may be representative of any electronic device, either physical or virtualized, capable of executing machine-readable program instructions.

Although FIG. 1 shows one example of a computing system 100, a computing system 100 may take many different forms, including bare metal computer systems, virtualized computer systems, container-oriented architecture, microservice-oriented architecture, etc. For example, computing system 100 can take the form of a desktop computer system or workstation, laptops, notebooks, tablets, servers, client devices, network devices, network terminals, thin clients, thick clients, kiosks, mobile communication devices (e.g., smartphones), multiprocessor systems, microprocessor-based systems, minicomputer systems, mainframe computer systems, smart devices, and/or Internet of Things (IoT) devices. The computing systems 100 can operate in a local computing environment, networked computing environment, a containerized computing environment comprising one or more pods or clusters of containers, and/or a distributed cloud computing environment, which can include any of the systems or devices described herein and/or additional computing devices or systems known or used by a person of ordinary skill in the art.

Computing system 100 may include communications fabric 112, which can provide for electronic communications among one or more processor(s) 103, memory 105, persistent storage 106, cache 107, communications unit 111, and one or more input/output (I/O) interface(s) 115. Communications fabric 112 can be implemented with any architecture designed for passing data and/or controlling information between processor(s) 103 (such as microprocessors, CPUs, and network processors, etc.), memory 105, external devices 117, and any other hardware components within a computing system 100. For example, communications fabric 112 can be implemented as one or more buses, such as an address bus or data bus.

Memory 105 and persistent storage 106 may be computer-readable storage media. Embodiments of memory 105 may include random access memory (RAM) and/or cache 107 memory. In general, memory 105 can include any suitable volatile or non-volatile computer-readable storage media and may comprise firmware or other software programmed into the memory 105. Program(s) 114, application(s), processes, services, and installed components thereof, described herein, may be stored in memory 105 and/or persistent storage 106 for execution and/or access by one or more of the respective processor(s) 103 of the computing system 100.

Persistent storage 106 may include a plurality of magnetic hard disk drives, solid-state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 106 can also be removable. For example, a removable hard drive can be used for persistent storage 106. Other examples include optical and magnetic disks, thumb drives, and smart cards that are inserted into a drive for transfer onto another computer-readable storage medium that is also part of persistent storage 106.

Communications unit 111 provides for the facilitation of electronic communications between computing systems 100. For example, between one or more computer systems or devices via a communication network. In the exemplary embodiment, communications unit 111 may include network adapters or interfaces such as a TCP/IP adapter cards, wireless interface cards, or other wired or wireless communication links. Communication networks can comprise, for example, copper wires, optical fibers, wireless transmission, routers, load balancers, firewalls, switches, gateway computers, edge servers, and/or other network hardware which may be part of, or connect to, nodes of the communication networks including devices, host systems, terminals or other network computer systems. Software and data used to practice embodiments of the present disclosure can be downloaded to the computing systems 100 operating in a network environment through communications unit 111 (e.g., via the Internet, a local area network, or other wide area networks). From communications unit 111, the software and the data of program(s) 114 or application(s) can be loaded into persistent storage 106.

One or more I/O interfaces 115 may allow for input and output of data with other devices that may be connected to computing system 100. For example, I/O interface 115 can provide a connection to one or more external devices 117 such as one or more smart devices, IoT devices, recording systems such as camera systems or sensor device(s), input devices such as a keyboard, computer mouse, touch screen, virtual keyboard, touchpad, pointing device, or other human interface devices. External devices 117 can also include portable computer-readable storage media such as, for example, thumb drives, portable optical or magnetic disks, and memory cards. I/O interface 115 may connect to human-readable display 118. Human-readable display 118 provides a mechanism to display data to a user and can be, for example, computer monitors or screens. For example, by displaying data as part of a graphical user interface (GUI). Human-readable display 118 can also be an incorporated display and may function as a touch screen, such as a built-in display of a tablet computer.

Figure 2:
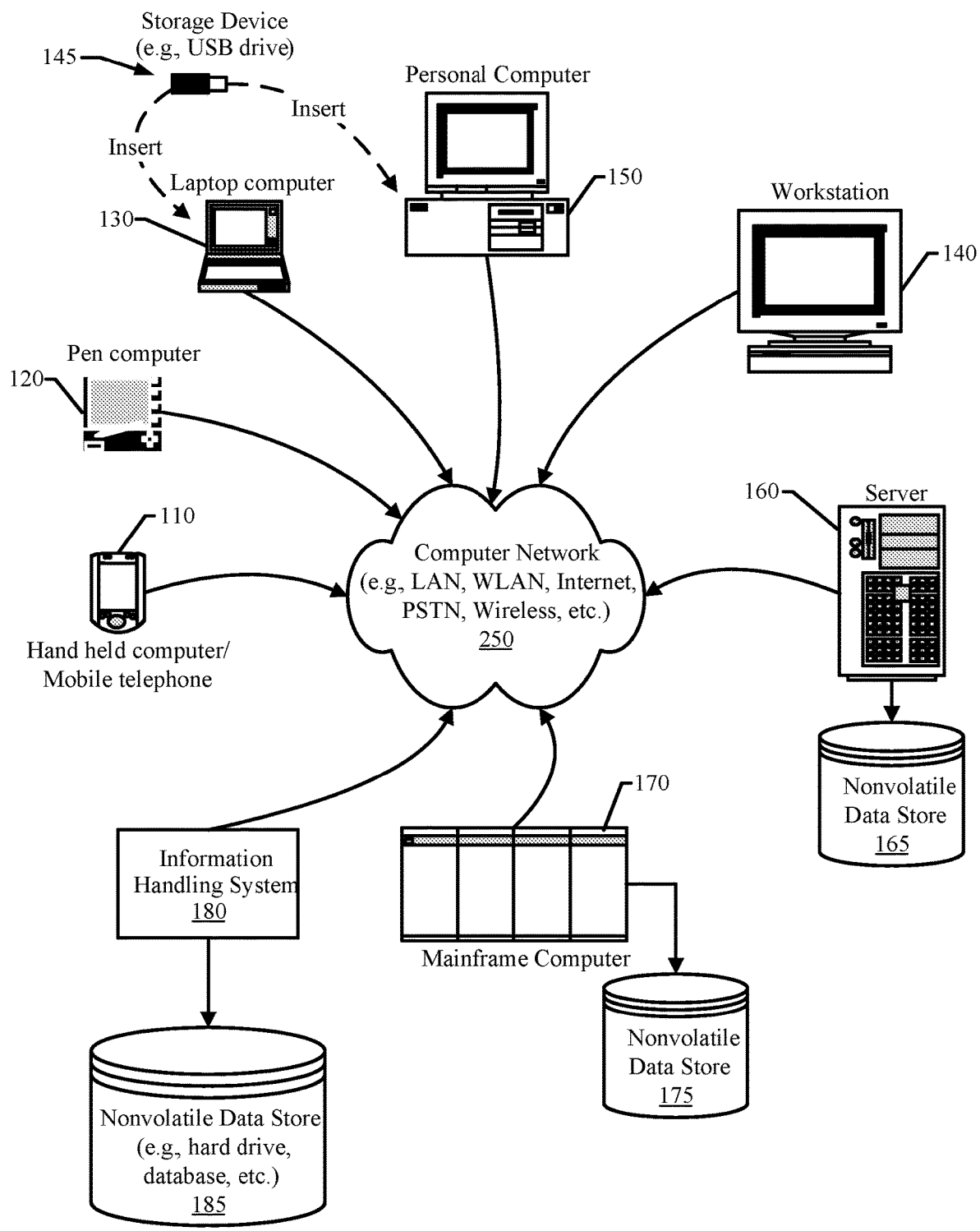
FIG. 2 depicts a block diagram illustrating an extension of the computing system environment of FIG. 1, wherein the computing systems are configured to operate in a network environment and perform methods described herein in accordance with the present disclosure.

FIG. 2 provides an extension of the computing system 100 environment shown in FIG. 1 to illustrate that the methods described herein can be performed on a wide variety of computing systems that operate in a networked environment. Types of computing systems 100 may range from small handheld devices, such as handheld computer/mobile telephone 110 to large mainframe systems, such as mainframe computer 170. Examples of handheld computer 110 include personal digital assistants (PDAs), personal entertainment devices, such as Moving Picture Experts Group Layer-3 Audio (MP3) players, portable televisions, and compact disc players. Other examples of information handling systems include pen, or tablet computer 120, laptop or notebook computer 130, workstation 140, personal computer system 150, and server 160. Other types of information handling systems that are not individually shown in FIG. 2 are represented by information handling system 180.

Many of the computing systems can include nonvolatile data stores, such as hard drives and/or nonvolatile memory. The embodiment of the information handling system shown in FIG. 2 includes separate nonvolatile data stores (more specifically, server 160 utilizes nonvolatile data store 165, mainframe computer 170 utilizes nonvolatile data store 175, and information handling system 180 utilizes nonvolatile data store 185). The nonvolatile data store can be a component that is external to the various computing systems or can be internal to one of the computing systems. In addition, removable nonvolatile storage device 145 can be shared among two or more computing systems using various techniques, such as connecting the removable nonvolatile storage device 145 to a USB port or other connector of the computing systems. In some embodiments, the network of computing systems 100 may utilize clustered computing and components acting as a single pool of seamless resources when accessed through network 250 by one or more computing systems. For example, such embodiments can be used in a datacenter, cloud computing network, storage area network (SAN), and network-attached storage (NAS) applications.

As shown, the various computing systems 100 can be networked together using computer network 250 (referred to herein as "network 250"). Types of networks 250 that can be used to interconnect the various information handling systems include Local Area Networks (LANs), Wireless Local Area Networks (WLANs), home area network (HAN), wide area network (WAN), backbone networks (BBN), peer to peer networks (P2P), campus networks, enterprise networks, the Internet, single tenant or multi-tenant cloud computing networks, the Public Switched Telephone Network (PSTN), and any other network or network topology known by a person skilled in the art to interconnect computing systems 100.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
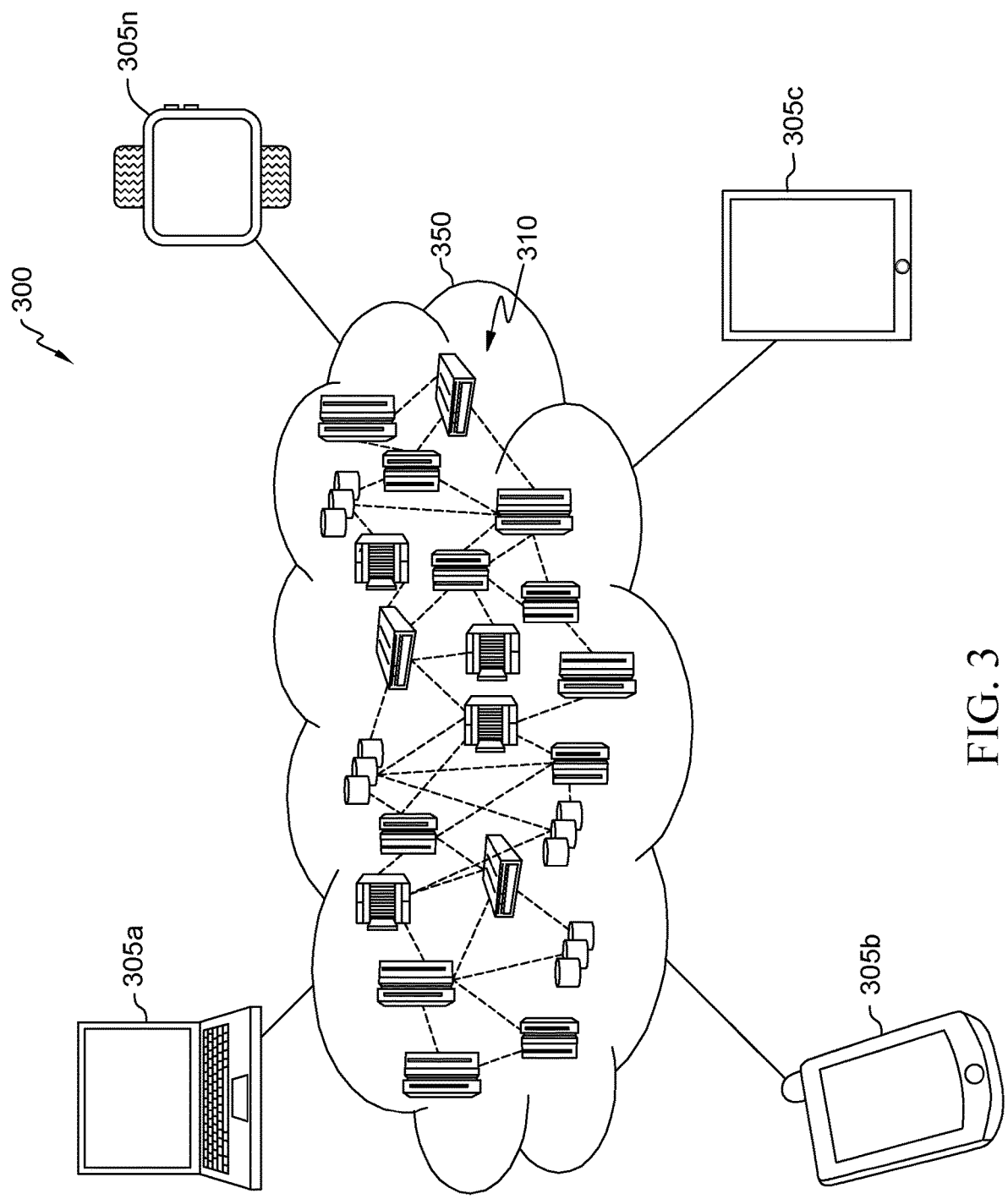
FIG. 3 depicts a block diagram illustrating a cloud computing environment in accordance with the present disclosure.

Referring to the drawings, FIG. 3 is an illustrative example of a cloud computing environment 300. As shown, cloud computing environment 300 includes a cloud network 350 comprising one or more cloud computing nodes 310 with which end user device(s) 305a-305n or client devices (referred to generally herein as end user device(s) 305 and may encompass presenter devices 515a-515n and/or audience device 519a-519n). End user device(s) 305 may be used by cloud consumers to access one or more software products, services, applications, and/or workloads provided by cloud service providers or tenants of the cloud network 350. Examples of the user device(s) 305 are depicted and may include devices such as a desktop computer, laptop computer 305a, smartphone 305b or cellular telephone, tablet computers 305c and smart devices such as a smartwatch 305n or smart glasses. Nodes 310 may communicate with one another and may be grouped (not shown) physically or virtually, in one or more networks, such as Private, Community, Public, or Hybrid clouds as described hereinabove, or a combination thereof. This allows cloud computing environment 300 to offer infrastructure, platforms and/or software as services for which a cloud consumer does not need to maintain resources on a local computing device. It is understood that the types of end user devices 305 shown in FIG. 3 are intended to be illustrative only and that computing nodes 310 of cloud computing environment 300 can communicate with any type of computerized device over any type of network and/or network addressable connection (e.g., using a web browser).

Figure 4:
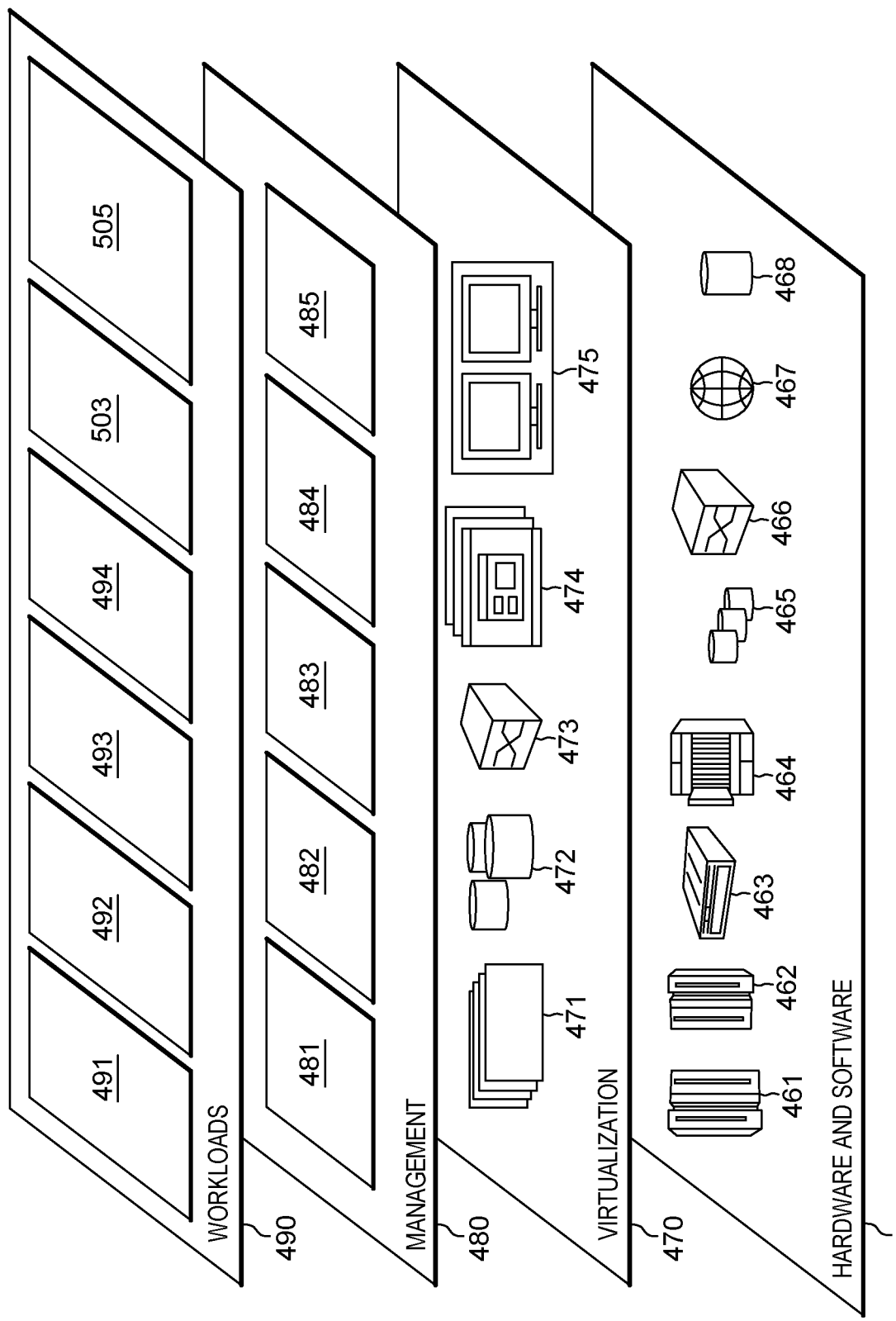
FIG. 4 depicts an embodiment of abstraction model layers of a cloud computing environment in accordance with the present disclosure.

Referring now to FIG. 4, a set of functional abstraction layers provided by cloud computing environment 300 is shown. It should be understood in advance that the components, layers, and functions shown in FIG. 4 are intended to be illustrative only and embodiments of the invention are not limited thereto. As depicted, the following layers and corresponding functions are provided:

Hardware and software layer 460 includes hardware and software components. Examples of hardware components include mainframes 461; RISC (Reduced Instruction Set Computer) architecture-based servers 462; servers 463; blade servers 464; storage devices 465; and networks and networking components 466. In some embodiments, software components include network application server software 467 and database software 468.

Virtualization layer 470 provides an abstraction layer from which the following examples of virtual entities may be provided: virtual servers 471; virtual storage 472; virtual networks 473, including virtual private networks; virtual applications and operating systems 474; and virtual clients 475.

Management layer 480 may provide the functions described below. Resource provisioning 481 provides dynamic procurement of computing resources and other resources that are utilized to perform tasks within the cloud computing environment 300. Metering and pricing 482 provide cost tracking as resources are utilized within the cloud computing environment 300, and billing or invoicing for consumption of these resources. In one example, these resources can include application software licenses. Security provides identity verification for cloud consumers and tasks, as well as protection for data and other resources. User portal 483 provides access to the cloud computing environment 300 for consumers and system administrators. Service level management 484 provides cloud computing resource allocation and management such that required service levels are met. Service Level Agreement (SLA) planning and fulfillment 485 provide pre-arrangement for, and procurement of, cloud computing resources for which a future requirement is anticipated in accordance with an SLA.

Workloads layer 490 provides examples of functionality for which the cloud computing environment may be utilized. Examples of workloads and functions which may be provided from this layer include software development and lifecycle management 491, data analytics processing 492, transaction processing 493, database management 494; interactive sessions 503 of videoconferencing or other virtual presentation platforms, and presentation module 505.

System for Issuing and Trading Speaking or Presentation Rights During Digital Events It will be readily understood that the instant components, as generally described and illustrated in the Figures herein, may be arranged and designed in a wide variety of different configurations. Accordingly, the following detailed description of the embodiments of at least one of a method, apparatus, non-transitory computer readable medium and system, as represented in the attached Figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the Figures, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

Figure 5:
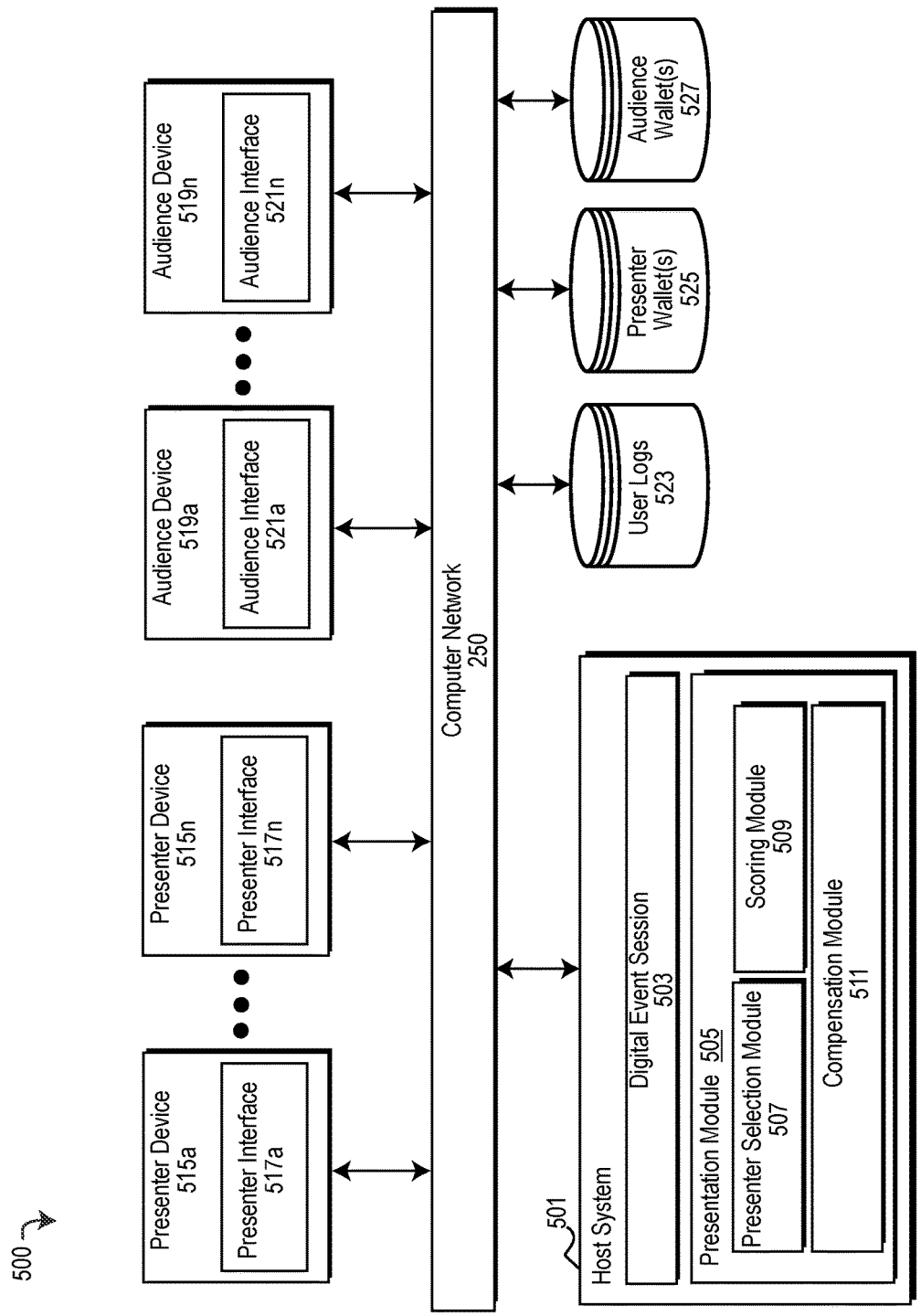
FIG. 5 depicts a functional block diagram describing an embodiment of a computing environment for issuing speaking and presentation rights during digital events, in accordance with the present disclosure.

Referring to the drawings, FIG. 5 depicts an embodiment of a computing environment 500 illustrating a system for issuing speaking or presentation rights (herein "presenter rights"), trading or selling those presenter rights in exchange for currency, tokens or other items (both real or virtual) representing value; and incentivizing audience members viewing digital events within a virtual environment to remain attentive and/or or active members of the audience as presentation rights change hands from one user to another. As illustrated, the computing environment 500 may be comprised of (among other components, systems or devices) a host system 501 connected to computer network 250 placing the host system 501 in communication with one or more presenter device 515a-515n (hereinafter presenter device 515), one or more audience device 519a-519n (hereinafter audience device 519), one or more user logs 523, and non-custodial wallets, including presenter wallet(s) 525 and/or audience wallet(s) 527.

Embodiments of host system 501 may refer to a computing system connected to a network 250 that may offer information, resources, services and/or applications to users, other hosts, or nodes of the network. In the exemplary embodiment, the host system 501 may provide software, applications or services providing digital events comprising virtual meeting spaces for users to convene and communicate with one another. For example, video conferencing or webinar tools or platforms where presenters and audience members can connect and view digital presentations, web conferences, live streams, meetings, and/or other types of interactive digital events within virtual environments. In addition to traditional computing environments, embodiments of digital events may also take place within virtual reality, the metaverse, augmented reality, etc. Participants, including both presenters and/or audience members can request connection to a digital event session 503 being hosted by host system 501. In some instances, a digital event session 503 may be open to the public, allowing anyone to join and view the digital event. In other instances, a digital event session 503 may be private, request a fee to enter, or may be only open to registered participants, or invitees who are specifically granted permission to join digital event session 503 as either presenters and/or audience members.

Embodiments of host system 501 may further comprise a presentation module 505, which may be deployed on the digital event session 503. Users, including both presenters and/or audience members can opt into presentation module 505 by performing an action that signifies the user's willingness to utilize or be subject to one or more features or functions of the presentation module 505. For example, users may opt-in by joining a conference session, webinar, chat room associated with the digital event, a virtual space, or other environment that allows the user to view the digital event and/or communicate with other users joining the digital event session 503. Embodiments of the presentation module 505 can introduce one or more functions or features into the digital event session 503 and make those additional features available to users opting into the presentation module 505. For example, functions or features directed toward issuing and/or trading presentation rights, as well as providing incentives such as compensation to presenters and/or audience members viewing the digital event. The term "module" may refer to a hardware module, software module, or a module may be a combination of hardware and software resources. A module (whether hardware, software or a combination thereof) may be designed to implement or execute one or more specific tasks, routines or functions. Embodiments of hardware-based modules may include self-contained components such as chipsets, specialized circuitry, one or more memory 105 devices and/or persistent storage 106. A software-based module may be part of a program 114, program code or linked to program code comprising a set of specific programmed instructions loaded into a memory 105 device or persistent storage 106 device.

As shown in FIG. 5, embodiments of the presentation module 505 may include one or more sub-modules or subcomponents. These sub-modules or subcomponents may perform one or more specific tasks, processes or functions associated with: issuing and/or trading presentation rights between the current presenter and the next presenter; collecting and analyzing audience metrics during the course of a digital event session 503; creating an NFT or other types of tokens and currency representing the presentation rights for the digital event that can be traded or auctioned in exchanged for currency or other resources of value; and manage the distribution of compensation or incentives to presenter(s) and/or audience members in exchange for presentation rights during the digital event session 503. Examples of sub-modules and/or subcomponents of the presentation module 505 may include a presenter selection module 507, scoring module 509, and compensation module 511.

Embodiments of presenter selection module 507 may be responsible for performing functions, tasks and/or processes associated with granting one or more rights or functions to users designated as having the role of a "presenter", "speaker", "host" or any other designation that might set the user apart from the rest of the audience members. Upon commencement of the digital event session 503, the presenter selection module 507 may assign presentation rights to a default user, such as the creator of the digital event session 503, another user selected by the creator of the digital event, or a user who may have registered with the host system 501 to present first during the digital event session 503. The first presenter(s) designated as having presentation rights during the digital event session 503 may be referred to as the "first presenter", "original presenter," variations thereof or similar designations. Upon enabling presentation rights for the first presenter, the first presenter may be able to access the additional functions or features associated with the presentation rights. These additional functions or features may be made available via the presenter's device 515a-515n (hereinafter presenter device 515) using the presenter interface 517a-517n (hereinafter presenter interface). For example, the first presenter may be able to, via the presenter interface 517, mute and unmute audience members, speak during the digital event, conduct audience polls, share a screen or files with the audience, control the view of a camera or select camera angles being displayed to the audience, change digital backgrounds, locations or settings of the digital event, relocate a position of an avatar on a virtual stage or within a digital environment, or control any other presentation or production element of the digital event. For example, in a digital event session 503 taking place within a virtual reality environment (such as the metaverse), the first presenter having presentation rights may be able to position their avatar in an area viewable by all audience members such as a stage which may be front and center within the virtual reality environment, while audience members may be restricted from accessing the virtual stage location.

Embodiments of the presenter selection module 507 may also enable or disable presentation rights of the first presenter and subsequent presenters, as possession of presentation rights are bought, sold, exchanged and/or licensed from one user to the next user over the course of the digital event session 503, and beyond. As presentation rights are bought, sold, exchanged and/or licensed to users either for a duration of time or without any time limit conditions, existing presenters transferring presentation rights may lose presentation rights and the ability to perform the plurality of features or functions that the presentation rights permit during the digital event session 503. Moreover, the users obtaining the presentation rights can have the plurality of features or functions enabled as part of the interface on their presenter device 515. In the exemplary embodiment, possession of one or more NFTs may signify to the presenter selection module 507 which users should be granted presenter rights. For example, the presence of an NFT in a user's non-custodial wallet may indicate to the presenter selection module 507 to enable the user with presentation rights, while existing presenters that transfer the NFT from a non-custodial wallet to another user, may indicate to the presenter selection module 507 to disable presentation rights of a user who was previously presenting during the digital event session 503. For instance, a first presenter is originally assigned presenter rights and, over the course of a presentation, a NFT is created with a particular value or estimated value based on gathered audience metrics. A second user can purchase or bid on the NFT to obtain presentation rights in order to become the next presenter during the digital event session 503. Upon exchange of payment and the NFT between the non-custodial presenter wallets 525, the presenter selection module 507 can enable presentation rights for the second user, making them the second presenter while disabling the presentation rights of the first presenter for the remaining duration of the digital event session 503, a set period of time and/or until the second presenter transfers the NFT back to the non-custodial wallet of the first presenter.

A scoring module 509 of the presentation module 505 may perform functions, tasks and processes associated with collecting audience metrics during a presenter's presentation and may generate a presenter score (or other metric) that is capable of quantifying the popularity, effectiveness, engagement and/or ability of a presenter to generate an active and attentive audience. Scoring module 509 can impute the presenter score into a compensation or monetary system where the tokens or currency can be traded for the right to become the next presenter. For example, by creating an NFT representing the presenter score that can be traded in exchange for presentation rights. As the presentation module is deployed on the digital event session 503, scoring module 509 may have access to one or more user logs 523. The user logs 523 accessed by scoring module 509 may contain information describing the presenter and/or audience members. For instance, user logs 523 can contain information and data such as a user ID, name, location, a smart wallet address, or any other profiled characteristics. In some instances, the user logs 523 may include presentation modifiers that may be associated with users. Presentation modifiers may augment a presenter score. For example, by adding rewards or penalties to the score. For instance, adding a +/−1 or more to the score, representing positive or negative aspects that may be known about the user and their abilities as a presenter from previous presentations. For example, if a presenter is known for timely concluding presentations within their specified time slot, a reliable presenter may have a +1, +2, +3, etc., bonus applied to their presenter score, whereas unreliable presenters that start late and/or finish presentations beyond their allotted time frame for presenting might be assessed a modifier that penalizes their presenter score, such as a −1, −2, −3, etc., penalty applied to their presenter score.

Embodiments of scoring module 509 may calculate presenter scores by capturing and/or weighting various audience metrics during a presenter's presentation. For example, audience metrics that can be captured may include such characteristics as a total number of audience members attending the digital event session 503, an average or maximum number of simultaneous audience members watching the presentation live at various points in time, the rate at which an audience increases or decreases in size during a presentation, amount of audience participation or audience responsiveness, positive or negative audience feedback, an amount of side channel discussions that may be occur within a chatting or voice channel, direct messaging, social media, etc. between audience members and/or audience members communicating with non-audience members about the presentation. As audience sizes increase and more engagement or excitement occurs during the course of a presenter's presentation, a presentation score may be weighted more positively resulting in a higher presenter score overall and thus may be imputed into an NFT or exchangeable currency for presentation rights having a higher amount of value (i.e., becoming more expensive for subsequent presenters to purchase presenter rights and take over the highly engaged and/or larger audience). In some embodiments, audience members attending a digital event session 503 may be utilizing a camera or recording device to present themselves to the presenter. Audience members' facial expressions, gaze or other facial features and body language may be tracked and measured for a level of attentiveness or engagement as the presenter is presenting during the digital event session 503. Facial expressions or body language indicating lack of attention, boredom or other negative characterizations about the speaker's presentation may have a negative impact on the presenter score, whereas excited, enthusiastic or attentive body language may be positively weighted to impact the presenter score.

Embodiments of the scoring module 509 may calculate a presenter score taking into consideration the captured audience metrics and may store the score to the scoring module 509 and/or a user profile associated with the presenter. Embodiments of the scoring module 509 can impute the weighted presentation score into a NFT or currency that can be traded to potential subsequent presenters vying for the right to take-over control of a presentation, inherit a potentially engaged or excited audience and receive the functions or features associated with obtaining presentation rights. Compensation module 511 may provide a compensation or monetary system configured to enable transactions exchanging NFTs, currency, tokens or other real or virtual objects representing presentation rights in exchange for valuable compensation between existing presenter(s) and potential subsequent presenter(s), as well as enable the delivery of compensation and incentives to audience members remaining active within the digital event session 503 for presentations by subsequent presenters.

Embodiments of compensation module 511 may facilitate the transaction exchanging presentation rights in a variety of different ways. For instance, in some embodiments, presentation rights may be captured or maintained by the next or subsequent presenter using a non-custodial wallet. Within the non-custodial wallet, an NFT and/or a smart contract may be present and may be define conditions and/or criteria for selecting a subsequent presenter and may be executed to determine ownership of the presentation rights. A non-custodial wallet provides the user with sole control over private keys which controls and proves funds and/or tokens within the non-custodial wallet belong to the user. A smart contract may refer to a program stored on a blockchain that runs when predetermine conditions are met. The smart contract can automate the execution of an agreement, such as the transfer of an NFT in exchange for currency in the amount of an agreed upon value, ensuring that all participants can be certain of the outcome without any intermediary's involvement; automating workflows and triggering the actions completing the transactions as conditions are met.

In exchange for an NFT or another type of token or currency denoting presentation rights upon a purchasing user, a smart contract stored by a presenter's wallet 525 may denote conditions of the exchange, including the current presenter providing the NFT, the wallet address of the NFT, the subsequent presenter receiving the NFT, the wallet address of the subsequent presenter, an amount of currency of other valuable consideration being provided in exchange for the NFT and the wallet address containing the funds or other valuable consideration being exchanged. Moreover, a condition may be described that will be met in order to trigger the execution of the smart contract or exchange of the NFT. For example, the potential subsequent presenter agrees to exchange a particular amount of money in exchange for the NFT and deposits the money into the potential subsequent presenter's non-custodial wallet. Upon execution of the NFT or smart contract, the subsequent presenter's payment can be deducted from their wallet and may be delivered to the current presenter's wallet 525 and/or may be split among one or more wallets of audience members (i.e., audience wallets 527). The ratio or split of the money or other funds being deposited in both the presenter wallet 525 and/or one or more audience wallets 527 may depend on the agreed upon arrangement between audience members, presenters, the platform hosting the digital event session 503, terms and conditions agreed upon by users entering the digital event session, etc. Terms and conditions defining the split of the money or currency or other consideration in exchange for NFT may be memorialized in the smart contract or by the NFT being executed. In some embodiments, rather than using a non-custodial wallet, funds can be deducted from banking accounts, using payment processing applications or services and/or other standard mechanisms for processing and fulfilling payment transactions.

In some embodiments, the compensation module 511 presentation rights and/or the NFT representing the granting of presentation rights during the digital event session 503 may be exchanged, bought, sold, traded, licensed, etc., using an auction format. For example, during the course of the digital event session 503, an auction for the NFT granting presentation rights may open up and members of the audience or potential presenters may bid on the right to receive the NFT. Users participating in the auction may bid on the NFT or other types of tokens and currency that may signify the grant of presentation rights. Compensation module 511 may collect bids placed by one or more user and may declare the winner of the auction for the NFT the user bidding the highest amount for the NFT. Once the auction has ended and the winning bidder has been declared, compensation module 511 may confirm the deduction and transfer of money, currency or other pledged items of value (real or digital) as part of the winning bid and upon receipt of the pledged items or currency defined by the winning bid, the compensation module 511 may transfer the NFT from the presenter's wallet to the wallet of the subsequent present that placed the winning bid. Similar to the embodiment described above, the money, currency or other pledged items of value (real or digital) as defined by the winning bid may be split amongst the current presenter and one or more audience members in a ratio or defined split, which may be in accordance with an agreed upon arrangement between audience members, presenters, the platform hosting the digital event session 503, terms and conditions agreed upon by users entering the digital event session, and/or the terms of the winning bid.

Embodiments of the compensation module 511 may lock or restrict compensation received by audience members from the sale, license, exchange and/or transfer of presentation rights during the digital event session 503. In order to incentivize audience members to remain present, active and/or engaged during the presentation of the subsequent presenter, the lock or restriction placed on the money, currency or other items of value deposited within the audience wallets 527 may remain in place for a specified minimum period of time. Once the minimum period of time has elapsed, and the audience member is, at the very least, still present within the audience of the digital event session 503, at least a portion (or all) of the locked or restricted compensation received from the transference of presentation rights to the subsequent presenter can become unrestricted or unlocked, making the money, funds, currency, tokens or other items of value available for withdrawal, transfer, spending or any other type of transaction. In some embodiments, compensation module 511 may only unlock or un-restrict a portion of the compensation stored in the audience wallet 527. Additional compensation within the audience wallet 527 may unlock or become unrestricted over time. For example, additional compensation received by audience members may unlock or restrictions may be removed at designated intervals of time or after completion of a particular event. For example, an event may include an attention check-in event that an audience member may be required to respond to within a limited period of time to indicate the audience member is still attentive to the presentation. In other embodiments, portions of compensation may be unlocked, or restrictions are removed randomly during the subsequent presenter's presentation so long as the audience member remains in the digital event session 503. In yet another embodiment, compensation stored by audience wallet 527 may be increasingly unlocked or un-restricted based on the amount of engagement or attentiveness displayed by the audience member. For example, an audience members displaying more engagement or attentiveness may have larger amounts of compensation unlocked or un-restricted within their audience wallets over time or unlocked at a faster interval of time, whereas uninterested, less attentive or less engaged audience members within the digital event session 503 receive smaller amounts (if any) of the compensation unlocked or un-restricted over time or at longer intervals of time.

Embodiments of the compensation module 511 may also perform functions or processes associated with adjusting compensation delivered to audience members or previous presenters and/or penalize current presenters, when a current presenter's actions fall outside the scope of an agreement made in exchange for presentation rights. For example, when the current presenter was seeking presentation rights or placing a bid during an auction for the presentation rights, as part of a condition of a smart contract or the NFT, the current presenter may have been obtaining presentation rights for a limited period of time in exchange for the compensation provided to other presenters and/or audience members. However, in some instances a current presenter that has been allotted a particular amount of time to present may be exceeding the amount of time purchased or agreed upon. Under such conditions compensation module 511 may collect additional compensation amounts from the presenter's wallet 525 and deposit the additionally collected compensation in the wallets of other presenters and/or audience wallets 527.

In some instances, a presenter that has exceeded their agreed upon allotted time in exchange for presentation rights may be further penalized. Penalties may be applied in the form of negative actions toward a presenter's reputation on an application, service or platform. For example, points, ratings or other indicators of a person's reputation may be decreased as a result of a penalty being applied toward a presenter's reputation. In some embodiments, a restriction may be placed on the presenter's account that may prevent the presenter from being a presenter in the future for a designated period of time. In other embodiments scoring modifiers as discussed above may be added to the profile of the presenter, which can affect the value the presenter receives from future potential presenters seeking to exchange presentation rights for currency, tokens or other items of value, resulting in the presenter receiving a lower amount for presentation rights than the presenter may have otherwise received. In other embodiments, negative impacts on a presenter's reputation may devalue their offers or bids for receiving presentation rights in the future. For instance, a presenter that has received a penalty based on their past conduct as a presenter, may require the user to offer more money or make a higher bid compared with other users offering the same amount of money, in order to secure presentation rights.

The following provides an example of how embodiments of the present disclosure may be implemented using the environment of FIG. 5 and variations thereof as described above. In this example, an IBM presenter joins a virtual conference session hosted by a host system 501 to discuss trends surrounding automation strategies. The IBM presenter opts into the presentation module 505 and joins the virtual conference. As the IBM presenter joins the virtual conference, presentation selection module 507 has access to the IBM presenter's UserID and is now aware that the presenter is Melanie from IBM, who is a technical sales specialist. As Melanie begins presenting, scoring module 509 begins to capture audience metrics, including the attentiveness of the audience based on audience interactions, responsiveness, side channel discussions, engagement, participation and feedback. These audience metrics are weighted and taken into consideration. In this example, Melanie's presentation score is given a rating of 85. Melanie's score is saved to the scoring module 509 and imputed into an NFT, currency or other type of token that can be traded for the presentation stage or speaking position with the captivated audience. The rights to become the next presenter are maintained through Melanie's non-custodial wallet and can be transferred to the next presenter when the next presenter purchases ownership rights from Melanie; either directly or through an auctioning system established by compensation module 511. In this example, Jake, another IBM employee is vying to become the next presenter and purchases the presentation rights from Melanie. Jake's payment is deducted from his wallet and split between Melanie and the audience based on the ratio agreed upon when entering the virtual conference session. Audience members receive payment which is locked or restricted at the start of Jake's presentation. However, as audience members attend Jake's presentation for a minimum amount of time and level of engagement, the payment received from Jake unlocks and can be used by audience members. Moreover, if Jake purchased 30 minutes of presentation time and Jake went over his allotted time by 15 minutes, Jake ends up paying additional compensation to Melanie and the audience members attending Jake's presentation, Furthermore, Jake's reputation may be negatively affected on the platform and as a result, Jake's ability to purchase additional presentation time slots may be more difficult in the future.

Figure 6A:
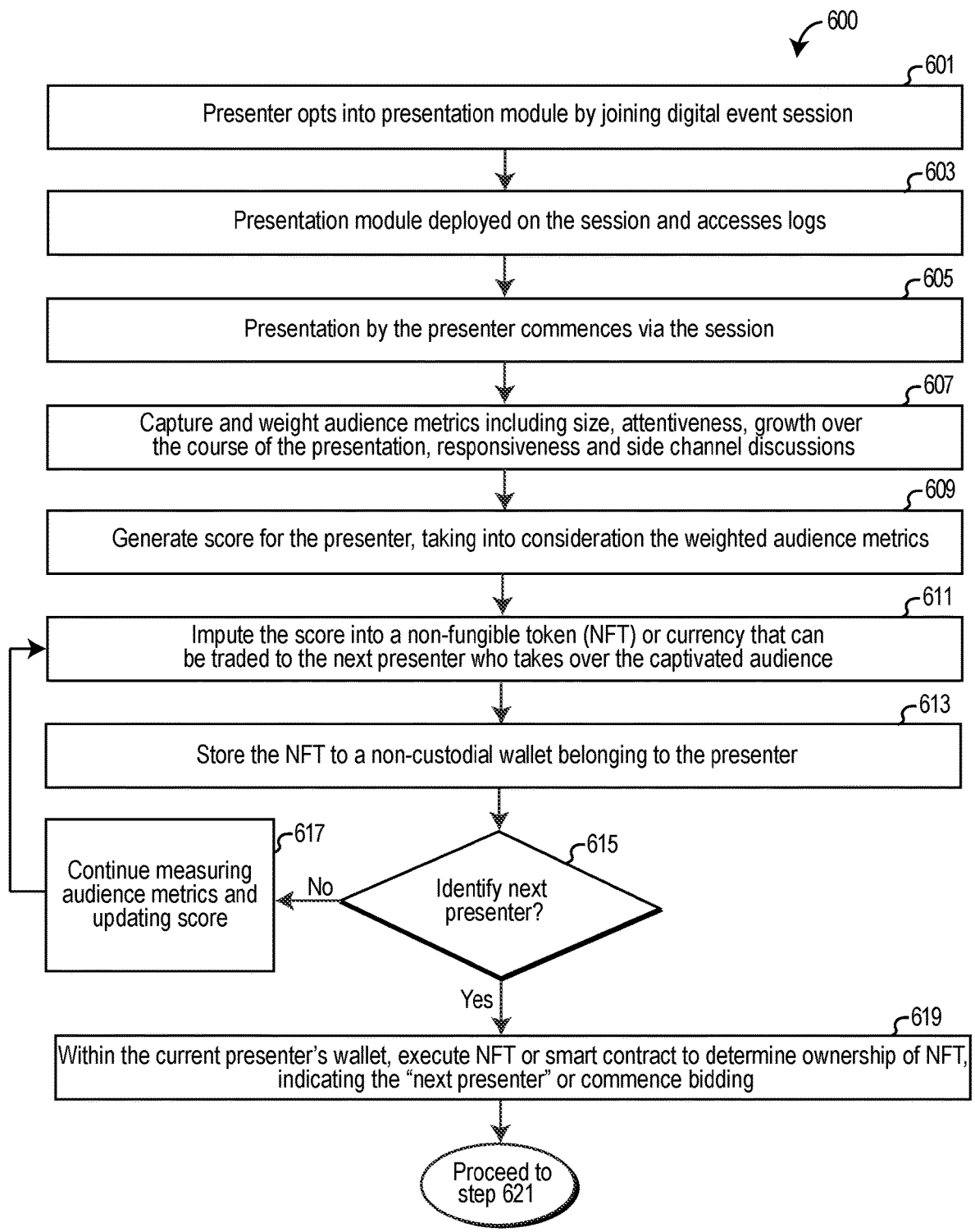
FIG. 6A depicts a flow diagram describing an embodiment of a method for issuing speaking and presentation rights during digital events in accordance with the present disclosure.
Figure 6B:
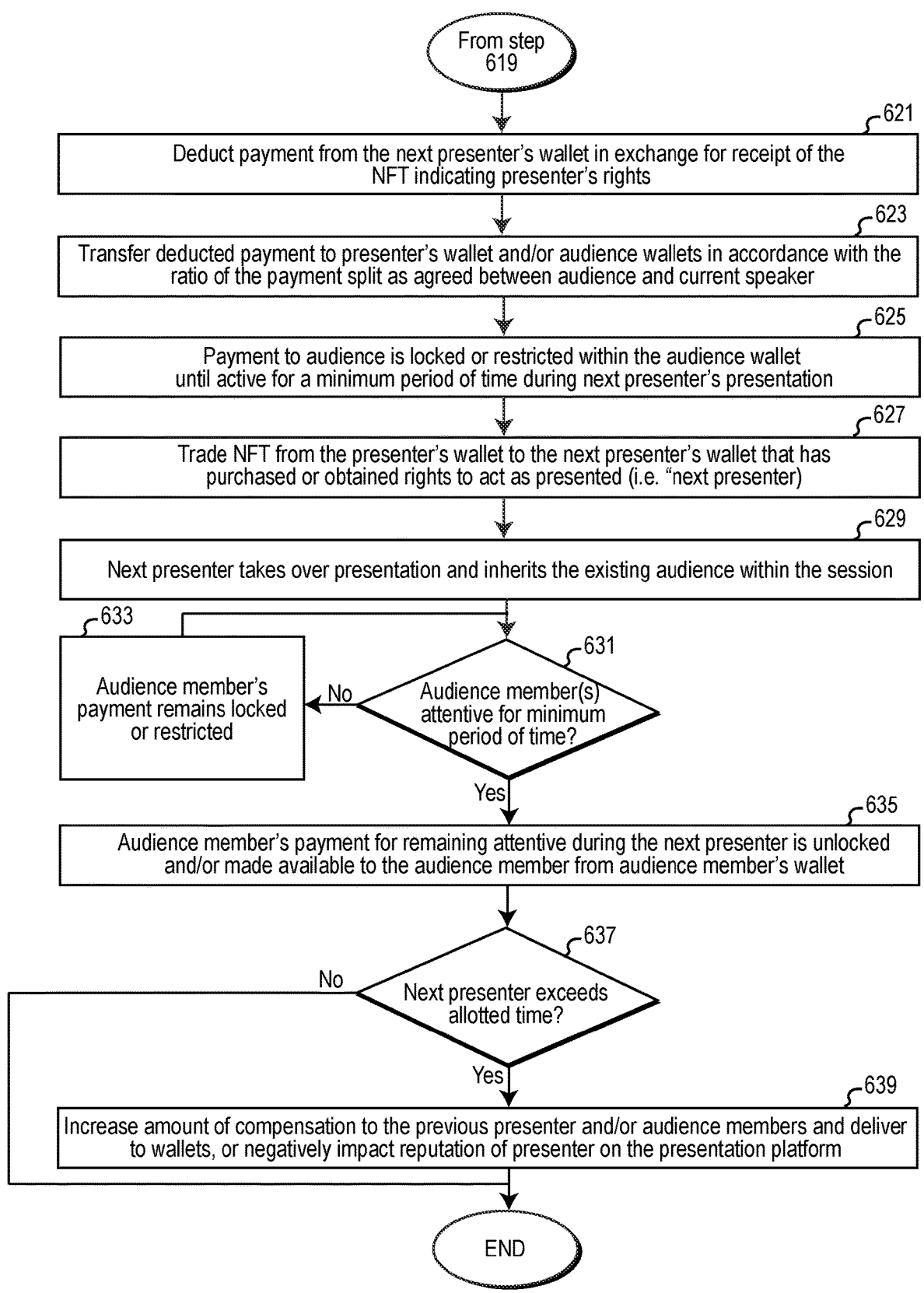
FIG. 6B depicts a flow diagram depicting a continuation of the embodiment of the method issuing speaking and presentation rights during digital events of FIG. 6A.

Method for Issuing and Trading Speaking or Presentation Rights During Digital Events The drawings of FIGS. 6A-6B represent embodiments of methods for issuing and trading speaking or presentation rights during digital events, in accordance with FIGS. 3-5 described above, using one or more computing systems defined generically by computing system 100 of FIGS. 1-2; and more specifically by the embodiments of the specialized systems and/or computing environments depicted in FIGS. 3-5 and as described herein. A person skilled in the art should recognize that the steps of the method described in FIGS. 6A-6B may be performed in a different order than presented and may not require all the steps described herein to be performed.

The embodiment of method 600 described by FIG. 6A may begin at step 601. During step 601 users accessing a digital event being offered by a platform, application or service provided by a host system 501 can opt into a presentation module 505 by joining a digital event session 503. The digital event session 503 being joined by the users can include joining a chat session, conference, webinar, virtual spaces or other types of virtual communications environments supported by the platform or application providing the digital event. Users joining the digital event session 503 may include audience members, presenter(s) and/or potential future presenters. In step 603, the presentation module 505 is deployed on the digital event session 503 enabling the presentation module 505 to access user logs 523 collecting data about individual presenters and/or audience members of the digital event session 503. For example, user logs 523 can include UserID, smart wallet addresses, names, presentation modifiers (i.e., +/−1), location data, reputations, and other characteristics that may be associated with profiles connected to the users joining the digital event.

In step 605 of method 600, the presentation may commence via the digital event session 503 with a first presenter designated with presentation rights and privileges within the digital event session 503. The presentation rights and privileges can include the ability speak during the digital event, enable and disable audience members' ability to be heard (i.e., mute and unmute microphones), share screen, image, audio, video or files, etc. As the presentation commences in step 605, the first presenter may be viewable to audience members via the audience interface 521a-521n of an audience device 519a-519n. In step 607, during the course of the digital event session 503, scoring module 509 captures audience metrics indicating the success, and influence of the presenter, how big of a draw the presenter is to audience members and the level of engagement the presenter has with their audience members. Metrics that can be collected by the scoring module 509 can include overall size of the audience, concurrent number of audience members viewing the presentation in real-time, attentiveness of audience members, rate of audience growth over time, responsiveness of audience members and engagement experienced in side-channels for discussion such as parallel chat sessions and/or messaging between audience members, as well as audience feedback. The collected audience metrics may be weighted together.

In step 609 scoring module 509 can generate a presenter score for the current presenter actively presenting within the digital event session 503. The presenter score may be an indicator of a presenter's popularity, engagement levels, ability to draw audience viewership, etc. and may be calculated by considering the weighted audience metrics collected by the scoring module 509. For example, higher scoring presenters may be observed to draw larger audiences, audiences that are more engaged with the presenter, generate more buzz or cross talk among audience members, regularly attend the presenter's digital events, and/or view the presentations of digital events for longer periods of time. Whereas lower scoring presenters may bring smaller audiences into digital event sessions and/or generate less engagement or activity amongst audience members during the digital event.

In step 611, the score assigned to an individual or group of presenters can be saved into the compensation module 511 and imputed into an NFT and/or smart contract that can be traded to a subsequent presenter who may take over presentation responsibilities during the digital event session and inherits the existing captivated audience members that are viewing the presentation made by the first presenter. In step 613, the NFT generated by compensation module 511 can be store the NFT or smart contract in a non-custodial wallet in the possession of the first presenter. Assignment of presentation rights can be performed by the first presenter's non-custodial wallet (i.e., presenter wallet 525) whereby the non-custodial wallet comprising the NFT is granted presentation rights, and transfer of the NFT to another non-custodial wallet grants presentation rights to the user who possesses the non-custodial wallet receiving the NFT. In step 615, a determination is made whether a time has come to identify the next presenter for the digital event session 503. If, during step 615 a determination is made that a time has not arrived for identifying the next presenter (i.e., the current presenter is still presenting or has an amount of allotted time remaining), the method 600 pay proceed to step 617. In step 617, the scoring module 509 continues to measure audience metrics and based on newly corrected metrics, the presenter's score is continuously updated to reflect the weighted audience metrics. Conversely, if in step 615 a determination is made that a time has arrived for identifying a subsequent presenter, then method 600 may proceed to step 619.

During step 619 of method 600, the NFT or smart contract with the current presenter's non-custodial wallet may be executed to select the next owner of the NFT and confirm presentation rights during the digital event session 503 onto the recipient of the NFT. For example, upon execution of the NFT or smart contract, the next owner of the NFT may be a user that has purchased the NFT by providing currency, compensation or other valuable consideration in exchange for the NFT. In alternative embodiments, execution of the NFT or smart contract may commence an auction style bidding process, allowing users (including audience members of the digital event session 503) to begin bidding for the right to possess the NFT and become the next presenter during the digital event. The winning user may be the user bidding the highest amount of compensation, such as currency or other monetary reward, in return for receiving the NFT, indicating that the winning user will become the subsequent presenter bestowed with presentation rights upon completion of the NFT transferring transaction.

In step 621 transference of the NFT between the current presenter and the subsequent presenter may commence. Payment for the NFT can be deducted from the subsequent presenter's non-custodial wallet in exchange for the NFT. In step 623, the payment deducted from the subsequent presenter's wallet is transferred to the current presenter's non-custodial wallet and/or the non-custodial wallet(s) of audience members attending the digital event session 503. The amount of compensation placed into current presenter's wallet and audience member wallet(s) may be a ratio predetermined in accordance with the terms and conditions of the digital event session 503 and/or recorded into the smart contracted being executed by the non-custodial wallet of the current presenter. Upon secure transfer of the funds or compensation paid by the subsequent presenter to the appropriate presenter wallet address and/or the wallet addresses of one or more audience member, the method may proceed to step 625. During step 625, the funds transferred to the audience members' wallets may be locked or restricted. The funds deposited in the non-custodial wallets of audience members may be time-sensitive and prevent audience members from accessing and/or withdrawing the deposited funds for a minimum period time. Incentivizing audience members to maintain their attendance within the digital event session and/or remain engaged with the subsequent presenter's presentation for at least the minimum period of time in order to access at least a portion of the deposited funds.

During step 627, the NFT is transferred from the current presenter's wallet to the subsequent presenter's wallet that has purchased, bid or traded for the NFT, bestowing upon the subsequent presenter presentation rights that were previously permitted during the digital event session 503 by the current (now previous) presenter. In step 629, the subsequent presenter takes over the presentation of the digital event session 503 and inherits the existing audience already in attendance of the digital event, along with any newly joining audience members. In step 631, determination is made whether any of the audience members receiving an incentive deposited within their non-custodial wallets have attended or been attentive to the subsequent presenter for the minimum period of time necessary to unlock at least a portion of the funds deposited to their audience wallet(s) 527. If the minimum period of time has not passed yet, the method 600 may proceed to step 633 whereby the funds deposited into the audience members' wallet remains locked or restricted. However, if in step 631 a determination is made that the audience member has been in attendance during the subsequent presenter's presentation for the minimum period of time, then the method 600 may proceed to step 635. During step 635, at least a portion (if not the entirety) of the funds deposited into the audience members' wallet as an incentive for remaining attentive or in attendance during the digital event for the subsequent presenter is unlocked or no longer restricted. The audience member can access the unlocked or unrestricted funds and/or withdraw those funds from the wallet. In embodiments where only a portion of the deposited funds unlocks or becomes unrestricted, additional amounts of funds may be unlocked or unrestricted at regular intervals of time the audience member remains within the digital event and/or at random times throughout the subsequent presenter's presentation.

In step 637, a determination is further made whether the subsequent presenter has exceeded an amount of allotted time purchased as part of the condition for obtaining the NFT. If the subsequent presenter's presentation concludes and the presenter has not exceeded the allotted time, the method 600 may end, or, if another presenter is taking over the presentation rights by purchasing or receiving the NFT, the method may proceed back to step 607. Conversely, if the subsequent presenter in step 637 has exceeded an allotted amount of time provisioned as part of the receipt of the NFT to be in the presenter role, the method 600 may proceed to step 639. In step 639, additional compensation may be owed or provided to the first presenter and/or audience members due. Additional funds may be withdrawn from the subsequent presenter's wallet and deposited into the wallets of the first presenter and/or the wallets of audience members to compensate them for the additional amount of time being utilized by the subsequent presenter. In some embodiments, the subsequent presenter may receive a penalty associated with their reputation on the platform, service or application used to provide the digital event session. For example, a user rating, numerical score or other indication of reputation may be issued a penalty or decrease for not keeping the presentation within the allotted time. Moreover, in some instances, penalized users or users with lower reputation on a platform, service or application may be required to provide an additional amount of compensation or funds to secure NFTs during future digital events when compared with the amount of funds or compensation provided by unpenalized users trading funds or compensation to secure possession of NFTs.

What is claimed is:

1. A computer-implemented method, comprising:
    capturing, by a processor, audience metrics during a digital event;
    capturing, by the processor, at least one of facial expressions, gaze, or facial features of each member of an audience during the digital event, wherein the at least one of facial expressions, gaze, or facial features of each member of the audience is captured from an imaging device associated with a corresponding member of the audience during the digital event;
    determining, by the processor, a level of audience attentiveness based on the captured at least one of facial expressions, gaze, or facial features;
    determining, by the processor, weights for the audience metrics based on at least one of a size of the audience during the digital event, the determined level of audience attentiveness, a rate of audience growth during the digital event, or an amount of side-channel discussions during the digital event;
    applying, by the processor, the determined weights to the audience metrics captured during the digital event;
    calculating, by the processor, a score assigned to a current presenter during the digital event, taking into consideration the audience metrics and the weights applied to the audience metrics;
    generating, by the processor, a non-fungible token (NFT) based on the score assigned to the current presenter, wherein the NFT represents the score of the current presenter;
    storing, by the processor, the NFT in a non-custodial wallet belonging to the current presenter, wherein possession of the NFT in a non-custodial wallet possessed by a subsequent presenter grants presentation rights during the digital event;
    executing, by the processor, the NFT to select the subsequent presenter;

receiving, by the processor, information associated with a plurality of bidding amounts from a plurality of candidates bidding to attain the presentation rights during the digital event, wherein each candidate of the plurality of candidates bids a corresponding bidding amount of the plurality of bidding amounts, and the information associated with the plurality of bidding amounts is received based on the execution of the NFT;

selecting, by the processor, a candidate among the plurality of candidates as the subsequent presenter, wherein the selected candidate is associated with a highest bidding amount among the plurality of bidding amounts;

electronically transferring, by the processor, currency from a digital wallet possessed by the selected candidate to a digital wallet belonging to the current presenter and one or more digital wallets of audience members attending the digital event;

upon transferring the currency from the digital wallet possessed by the selected candidate to the digital wallet belonging to the current presenter and the one or more digital wallets of audience members, depositing, by the processor, the NFT into the non-custodial wallet possessed by the selected candidate; and upon transferring the NFT to the non-custodial wallet possessed by the selected candidate, granting, by the processor, the presentation rights to the selected candidate as the subsequent presenter during the digital event.

2. The computer-implemented method of claim 1, further comprising:

locking, by the processor, the currency transferred to the one or more digital wallets of audience members, preventing the audience members from accessing the currency for a minimum period of time; and upon audience members remaining present at the digital event for the minimum period of time following the transfer of the NFT to the non-custodial wallet possessed by the subsequent presenter, unlocking, by the processor, at least a portion of the currency stored in the one or more digital wallets of the audience members.

3. The computer-implemented method of claim 1, further comprising:

executing, by the processor, a smart contract within the non-custodial wallet belonging to the current presenter, wherein the smart contract identifies an identity of the subsequent presenter, an address of the non-custodial wallet possessed by the subsequent presenter, an amount of the currency being exchanged for the NFT, addresses of the one or more digital wallets of the audience members, and a ratio of the currency being transferred to the digital wallet belonging to the current presenter and the one or more digital wallets of the audience members attending the digital event.

4. The computer-implemented method of claim 1, wherein the deposit of the NFT into the non-custodial wallet possessed by the subsequent presenter provides the presentation rights to the subsequent presenter for a predetermined amount of time, and the computer-implemented method further comprises:

upon exceeding the predetermined amount of time:
deducting, by the processor, an additional amount of currency from the digital wallet possessed by the subsequent presenter, wherein the additional amount of currency corresponds to an amount of time exceeding the predetermined amount of time, or applying, by the processor, a penalty to a reputation of the subsequent presenter.

5. The computer-implemented method of claim 1, wherein the digital event occurs within a virtual reality environment with the current presenter represented on a stage by an avatar and obtaining the presentation rights by possessing the NFT grants the subsequent presenter's avatar permissions to access the stage within the virtual reality environment.

6. A computer system, comprising:
a processor; and
a computer-readable storage media coupled to the processor, wherein the computer-readable storage media contains program instructions executing, via the processor, a computer-implemented method comprising:

capturing, by the processor, audience metrics during a digital event;

capturing, by the processor, at least one of facial expressions, gaze, or facial features of each member of an audience during the digital event, wherein the at least one of facial expressions, gaze, or facial features of each member of the audience is captured from an imaging device associated with a corresponding member of the audience during the digital event;

determining, by the processor, a level of audience attentiveness based on the captured at least one of facial expressions, gaze, or facial features;

determining, by the processor, weights for the audience metrics based on at least one of a size of the audience during the digital event, the determined level of audience attentiveness, a rate of audience growth during the digital event, or an amount of side-channel discussions during the digital event;

applying, by the processor, the determined weights to the audience metrics captured during the digital event;

calculating, by the processor, a score assigned to a current presenter during the digital event, taking into consideration the audience metrics and the weights applied to the audience metrics;

generating, by the processor, a non-fungible token (NFT) based on the score assigned to the current presenter, wherein the NFT represents the score of the current presenter;

storing, by the processor, the NFT in a non-custodial wallet belonging to the current presenter, wherein possession of the NFT in a non-custodial wallet possessed by a subsequent presenter grants presentation rights during the digital event;

executing, by the processor, the NFT to select the subsequent presenter;

receiving, by the processor, information associated with a plurality of bidding amounts from a plurality of candidates bidding to attain the presentation rights during the digital event, wherein each candidate of the plurality of candidates bids a corresponding bidding amount of the plurality of bidding amounts, and the information associated with the plurality of bidding amounts is received based on the execution of the NFT;

selecting, by the processor, a candidate among the plurality of candidates as the subsequent presenter, wherein the selected candidate is associated with a highest bidding amount among the plurality of bidding amounts;

electronically transferring, by the processor, currency from a digital wallet possessed by the selected candidate to a digital wallet belonging to the current presenter and one or more digital wallets of audience members attending the digital event;

upon transferring the currency from the digital wallet possessed by the selected candidate to the digital wallet belonging to the current presenter and the one or more digital wallets of audience members, depositing, by the processor, the NFT into the non-custodial wallet possessed by the selected candidate; and upon transferring the NFT to the non-custodial wallet possessed by the selected candidate, granting, by the processor, the presentation rights to the selected candidate as the subsequent presenter during the digital event.

7. The computer system of claim 6, further comprising:
locking, by the processor, the currency transferred to the one or more digital wallets of audience members, preventing the audience members from accessing the currency for a minimum period of time; and
upon audience members remaining present at the digital event for the minimum period of time following the transfer of the NFT to the non-custodial wallet possessed by the subsequent presenter, unlocking, by the processor, at least a portion of the currency stored in the one or more digital wallets of the audience members.

8. The computer system of claim 6, further comprising:
executing, by the processor, a smart contract within the non-custodial wallet belonging to the current presenter, wherein the smart contract identifies an identity of the subsequent presenter, an address of the non-custodial wallet possessed by the subsequent presenter, an amount of the currency being exchanged for the NFT, addresses of the one or more digital wallets of the audience members, and a ratio of the currency being transferred to the digital wallet belonging to the current presenter and the one or more digital wallets of the audience members attending the digital event.

9. The computer system of claim 6, wherein the deposit of the NFT into the non-custodial wallet possessed by the subsequent presenter provides the presentation rights to the subsequent presenter for a predetermined amount of time, and the computer-implemented method further comprises:
upon exceeding the predetermined amount of time;
deducting, by the processor, an additional amount of currency from the digital wallet possessed by the subsequent presenter, wherein the additional amount of currency corresponds to an amount of time exceeding the predetermined amount of time, or
applying, by the processor, a penalty to a reputation of the subsequent presenter.

10. A computer program product, comprising:
one or more computer readable storage media having computer-readable program instructions stored on the one or more computer readable storage media, said program instructions executes a computer-implemented method comprising:
capturing, by a processor, audience metrics during a digital event;
capturing, by the processor, at least one of facial expressions, gaze, or facial features of each member of an audience during the digital event, wherein the at least one of facial expressions, gaze, or facial features of each member of the audience is captured from an imaging device associated with a corresponding member of the audience during the digital event;
determining, by the processor, a level of audience attentiveness based on the captured at least one of facial expressions, gaze, or facial features;
determining, by the processor, weights for the audience metrics based on at least one of a size of the audience during the digital event, the determined level of audience attentiveness, a rate of audience growth during the digital event, or an amount of side-channel discussions during the digital event;
applying, by the processor, the determined weights to the audience metrics captured during the digital event;
calculating, by the processor, a score assigned to a current presenter during the digital event, taking into consideration the audience metrics and the weights applied to the audience metrics;
generating, by the processor, a non-fungible token (NFT) based on the score assigned to the current presenter, wherein the NFT represents the score of the current presenter;
storing, by the processor, the NFT in a non-custodial wallet belonging to the current presenter, wherein possession of the NFT in a non-custodial wallet possessed by a subsequent presenter grants presentation rights during the digital event;
executing, by the processor, the NFT to select the subsequent presenter;
receiving, by the processor, information associated with a plurality of bidding amounts from a plurality of candidates bidding to attain the presentation rights during the digital event, wherein each candidate of the plurality of candidates bids a corresponding bidding amount of the plurality of bidding amounts, and the information associated with the plurality of bidding amounts is received based on the execution of the NFT;
selecting, by the processor, a candidate among the plurality of candidates as the subsequent presenter, wherein the selected candidate is associated with a highest bidding amount among the plurality of bidding amounts;
electronically transferring, by the processor, currency from a digital wallet possessed by the selected candidate to a digital wallet belonging to the current presenter and one or more digital wallets of audience members attending the digital event;
upon transferring the currency from the digital wallet possessed by the selected candidate to the digital wallet belonging to the current presenter and the one or more digital wallets of audience members, depositing, by the processor, the NFT into the non-custodial wallet possessed by the selected candidate; and
upon transferring the NFT to the non-custodial wallet possessed by the selected candidate, granting, by the processor, the presentation rights to the selected candidate as the subsequent presenter during the digital event.

11. The computer program product of claim 10, further comprising:
locking, by the processor, the currency transferred to the one or more digital wallets of audience members, preventing the audience members from accessing the currency for a minimum period of time; and upon audience members remaining present at the digital event for the minimum period of time following the transfer of the NFT to the non-custodial wallet possessed by the subsequent presenter, unlocking, by the processor, at least a portion of the currency stored in the one or more digital wallets of the audience members.

12. The computer program product of claim 10, further comprising:
executing, by the processor, a smart contract within the non-custodial wallet belonging to the current presenter, wherein the smart contract identifies an identity of the subsequent presenter, an address of the non-custodial wallet possessed by the subsequent presenter, an amount of the currency being exchanged for the NFT, addresses of the one or more digital wallets of the audience members, and a ratio of the currency being transferred to the digital wallet belonging to the current presenter and the one or more digital wallets of the audience members attending the digital event.

13. The computer program product of claim 10, wherein the deposit of the NFT into the non-custodial wallet possessed by the subsequent presenter provides the presentation rights to the subsequent presenter for a predetermined amount of time, and the computer-implemented method further comprises:
upon exceeding the predetermined amount of time;
deducting, by the processor, an additional amount of currency from the digital wallet possessed by the subsequent presenter, wherein the additional amount of currency corresponds to an amount of time exceeding the predetermined amount of time, or
applying, by the processor, a penalty to a reputation of the subsequent presenter.

14. The computer program product of claim 10, wherein the digital event occurs within a virtual reality environment with the current presenter represented on a stage by an avatar and obtaining the presentation rights by possessing the NFT grants the subsequent presenter's avatar permissions to access the stage within the virtual reality environment.

* * * * *